(12) United States Patent
Coker et al.

(10) Patent No.: US 6,606,210 B1
(45) Date of Patent: Aug. 12, 2003

(54) INTELLIGENT SECTOR RECOVERY ALGORITHM

(75) Inventors: Kenny T. Coker, Mustang, OK (US); Raymond D. Nicholson, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/553,183

(22) Filed: Apr. 19, 2000

Related U.S. Application Data

(60) Provisional application No. 60/130,301, filed on Apr. 21, 1999.

(51) Int. Cl.[7] ............................................... G11B 5/09
(52) U.S. Cl. ......................... 360/53; 360/31; 360/77.04
(58) Field of Search ............................. 360/53, 31, 25, 360/77.04

(56) References Cited

U.S. PATENT DOCUMENTS

| | | | |
|---|---|---|---|
| 4,053,752 A | 10/1977 | DeJohn et al. ............ 235/302.1 |
| 4,516,165 A | 5/1985 | Cunningham et al. ......... 360/53 |
| 5,189,566 A | 2/1993 | Christensen et al. .......... 360/53 |
| 5,276,622 A | 1/1994 | Miller et al. ........... 364/424.05 |
| 5,331,476 A | 7/1994 | Fry et al. ...................... 360/53 |
| 5,379,162 A | 1/1995 | Cunningham et al. ......... 360/53 |
| 5,386,324 A | 1/1995 | Fry et al. ...................... 360/53 |
| 5,490,149 A | 2/1996 | Nylander-Hill ......... 395/182.03 |
| 5,627,843 A | 5/1997 | Deng et al. ................. 371/37.1 |
| 5,661,614 A | 8/1997 | Wallash et al. ............... 360/66 |
| 5,721,816 A | 2/1998 | Kusbel et al. .......... 395/182.13 |
| 5,812,752 A | 9/1998 | Yamada .................. 395/182.03 |
| 5,918,001 A | 6/1999 | Ueno et al. ............ 395/182.06 |
| 6,040,953 A * | 3/2000 | Malone et al. ................ 360/53 |
| 6,078,461 A * | 6/2000 | Smith et al. ............. 360/77.04 |
| 2002/0008928 A1 * | 1/2002 | Takahashi .................... 360/53 |

* cited by examiner

*Primary Examiner*—David Hudspeth
*Assistant Examiner*—Varsha A Kapadia
(74) *Attorney, Agent, or Firm*—Kirk A. Cesari

(57) ABSTRACT

A disc drive includes a base and a disc rotatably attached to the base. The disc drive also includes an actuator assembly rotatably attached to said base and a device for moving the actuator assembly. The disc drive also includes at least one sensor for sensing disturbances to the disc drive. The disc drive has a system microprocessor in electrical communication with the sensor. In the event a read error is detected, a plurality of sets of corrective procedures are stored in the random access memory of the microprocessor. The system microprocessor executes the sets of corrective procedures in an order in response to the sensed disturbances input to the system microprocessor.

9 Claims, 6 Drawing Sheets

| READ ERROR RECOVERY TABLE ||
|---|---|
| TABLE COUNT | CORRECTIVE OPERATION |
| 1 | SEEK AWAY |
| 2 | REREAD DATA |
| 3 | REREAD DATA |
| 4 | ADAPT READ CHANNEL |
| 5 | CHANGE ECC LEVEL |
| 6 | CHANGE ECC LEVEL |
| 7 | CHANGE ECC LEVEL |
| 8 | CHANGE ECC LEVEL |
| 9 | +6% OFF TRACK CENTER |
| 10 | +6% OFF TRACK CENTER |
| 11 | -6% OFF TRACK CENTER |
| 12 | -6% OFF TRACK CENTER |
| 13 | +12% OFF TRACK CENTER |
| 14 | +12% OFF TRACK CENTER |
| 15 | -12% OFF TRACK CENTER |
| 16 | -12% OFF TRACK CENTER |
| 17 | WIGGLE RETRY |

FIG. 6

| HEAD # | FLYHEIGHT | TIME |
|---|---|---|
| 0 | .2 | 10/31/99 |
| 0 | .2 | 10/30/99 |
| 0 | .16 | 10/29/99 |
| 0 | .10 | 10/28/99 |
| 0 | .2 | 10/27/99 |
| 0 | .05 | 10/26/99 |
| ⋮ | ⋮ | 10/25/99 |
| ⋮ | ⋮ | 10/24/99 |
| ⋮ | ⋮ | ⋮ |
| N | X | PRESENT |
|  |  |  |

FIG. 7

INTELLIGENT SECTOR RECOVERY ALGORITHM

RELATED APPLICATION

This application claims the benefit of U.S. Provisional Application Ser. No. 60/130,301, filed Apr. 21, 1999 under 35 U.S.C. 119(e).

FIELD OF THE INVENTION

The present invention relates to the field of mass storage devices. More particularly, this invention relates to an apparatus and method for recovering data from a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

The methods for positioning the transducers can generally be grouped into two categories. Disc drives with linear actuators move the transducer linearly generally along a radial line to position the transducers over the various tracks on the information storage disc. Disc drives also have rotary actuators which are mounted to the base of the disc drive for arcuate movement of the transducers across the tracks of the information storage disc. Rotary actuators position transducers by rotationally moving them to a specified location on an information recording disc.

Typically, the heads are supported over the discs by slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a signal which is decoded by a read channel circuit of the disc drive. For a detailed discussion of disc drive reading and writing techniques, see U.S. Pat. No. 5,276,662 entitled DISC DRIVE WITH IMPROVED DATA TRANSFER APPARATUS, issued Jan. 4, 1994 to Shaver et al., assigned to the assignee of the present invention.

As will be recognized, a user file to be written to the disc is typically encoded with both run-length limited encoding, to ensure proper generation of a read clock when the data is retrieved from the disc and with error correction code (ECC) encoding, to detect the presence of errors in the data as it is subsequently retrieved from the disc. Even with the use of such encoding, it will be recognized that both write errors and read errors occasionally occur as large amounts of data are written to and read from the disc.

Write errors generally occur as a result of header errors, which occur when the incorrect header (sector) information is provided to the write controller, indicating the head is not over the target sector to which the data is to be written. Additionally, write errors can occur as a result of an off-track condition (i.e., the head is not correctly positioned over the selected data track) and as a result of an unsafe error condition, such as a voltage fault. When a write error occurs, the disc drive typically retries writing the data and, if the write error persists, may perform other corrective operations, such as moving the head to a track not normally used for the storage of user data and writing data at this track before returning the head to the selected track for another attempt.

Read errors, on the other hand, are typically detected as result of the operation of the ECC circuitry; particularly, modem disc drives are typically provided with the capability of "on-the-fly" correction of up to a selected number of errors in the retrieved data (as a result of the ECC encoding) and the detection of more than the selected number of errors in the retrieved data. Like write errors, when uncorrectable read errors are detected, the disc drive may reread the data and, if the read error persists, the disc drive may attempt other corrective operations, such as seeking away, which comprises moving the head away from, and then back to, the selected track and rereading the data, or modifying the channel parameters used by the read channel and rereading the data. For a discussion of ECC techniques, see U.S. Pat. No. 5,627,843 entitled CORRECTING UP TO TWO DISC DRIVE READ ERRORS AND DETECTING THE OCCURRENCE OF MORE THAN TWO READ ERRORS, issued May 6, 1997 to Deng et al., assigned to the assignee of the present invention.

It will be recognized that disc drives are commonly provided with a defined error recovery procedure in the event of the receipt of write and read errors, so that a predefined sequence of corrective operations is employed upon occurrence of such errors. A typical data recovery procedure includes rereads, head shifts and at least one error correcting code (ECC). Each specific hard disc drive normally has one specified list defining a data recovery procedure (DRP) that is considered best for the disc drive. However, such corrective operations require time to complete, undesirably slowing down the operation of the disc drive in the writing or reading of user files. Additionally, depending upon the cause of the errors, certain corrective operations or DRPs are more effective than others in resolving the occurrence of the errors and allowing the operation of the disc drive to resume.

The use of corrective procedures or DRPs has progressed from merely proceeding serially down a list of corrective actions or data recovery procedures. In U.S. Pat. No. 5,379,162 issued to Cunningham et al, when a readback error is detected in a readback data signal, a plurality of predetermined transducer head and disc parameters are identified. One of the stored plurality of data recover procedures is selected in response to the detected readback error and the identified plurality of predetermined transducer head and disc parameters. This patent is directed toward a dedicated servo disc drive. The input parameters are static parameters that are not associated with random events. The static input parameters do not appear to change over time. In fact, the input parameters are predetermined. The parameters include the head width, the amount of track misregistration associated with the distance the head is positioned away from the dedicated servo surface, and the radial location on the disc. Depending on these static inputs, different corrective procedures are used. In U.S. Pat. No. 5,812,752 issued to Yamada, the length of time for executing selected corrective procedures or data recovery procedures is measured and the data recovery procedure used is selected based on the remaining execution time for performing the data recovery operation. In U.S. Pat. No. 5,721,816 issued to Kusbel et al., the table of different data recovery procedures is reordered based on data gathered when the data recovery procedure works.

Even with the improvements in the data recovery procedures discussed above, typically many different combinations of individual corrective actions are tried before an error is recovered. Each individual corrective action takes one revolution to complete. Data recovery can take several seconds if the error recovery function in the disc drive has to sequence through many of these combinations before finding the proper individual corrective action or combination of corrective actions that successfully recovers a block of data. For example, if the retry or corrective action happens to be 120th on the list of corrective actions associated with the data recovery procedure (DRP), then 121 retries or corrective actions must be taken before successfully recovering the data. If the disc is spinning at 7200 revolutions per minute (RPM), currently a fairly common rotational spin speed, the 120 retries would require 120 revolutions of the disc. The amount of time required for the 120 revolutions would be 1 second. This is an eternity in an industry which boasts data access times of 6 milliseconds. Furthermore, if there are 450 sectors per /revolution and each sector contains 512 bytes of data, during the one second delay potentially 27,648,000 bytes of data which could have been read were passed up due to the read re-tries.

In disc drives, there can be many different events that can trigger an error that would need to be corrected using a data recovery procedure. There can be many different failure mechanisms. Since each data recovery procedure has a different probability of success for a given failure mechanism, one given DRP or recovery list is not optimum for specific cases.

Thus, there is a need for a data recovery procedure which eliminates individual data recovery procedures that have a low probability of resulting in correction. In addition, there is a need for an improved approach to the correction of read and write errors encountered by a disc drive which reduces the time required to recover from such errors. There is also a need for a data recovery technique that adapts to the various conditions causing the read and write errors.

SUMMARY OF THE INVENTION

A disc drive includes a base and a disc rotatably attached to the base. The disc drive also includes an actuator assembly rotatably attached to said base and a device for moving the actuator assembly. The disc drive also includes at least one sensor for sensing disturbances to the disc drive. The disc drive has a system microprocessor in electrical communication with the sensor. In the event a read error is detected, a plurality of sets of corrective procedures are stored in the random access memory of the microprocessor. The system microprocessor executes the sets of corrective procedures in an order in response to the sensed disturbances input to the system microprocessor. The sensor can be a log of data gathered over time, a query to at least one of the plurality of components of the disc drive, a temperature sensor within the disc drive, or a vibration sensor within the disc drive. The sensor of the disc drive may also include a table of data stored within the random access memory of the disc drive.

The disc drive employs a method of recovering data from a magnetic storage device. The magnetic storage device includes a plurality of components including a disc for storing data. The disc has at least one track in which includes a plurality of sectors for storing data. The storage device also has a transducer for reading and writing data to the surface of the disc. The method for recovering data includes sensing various disturbances to the disc drive, and detecting a read error in the data of at least one sector of said plurality of sectors. A read error recovery procedure is implemented based on sensing a disturbance to the disc drive. The read error recovery procedure which is implemented is associated with the sensed disturbance.

Implementing the corrective procedures or a read error recovery procedure includes selecting a grouping of corrective actions from a plurality of groups of corrective actions associated with a particular sensor. Each group of corrective actions is associated with a particular sensed disturbance.

Advantageously, the present invention provides a method and apparatus for optimizing the read/write channel error recovery process in a disc drive. The data recovery procedure eliminates individual data recovery procedures that have a low probability of resulting in correction. In addition, the corrective procedure reduces the time required to recover from read errors. Another advantage includes an error recovery procedure which adapts to the various conditions causing the read and write errors.

BRIEF DESCRIPTION OF THE DRAWINGS

FIG. 6 is a generalized representation of one of the read error recovery tables associated with one sensor utilized in the data recovery procedure shown in FIG. 5.

FIG. 7 is a table of data stored in memory of the disc drive.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
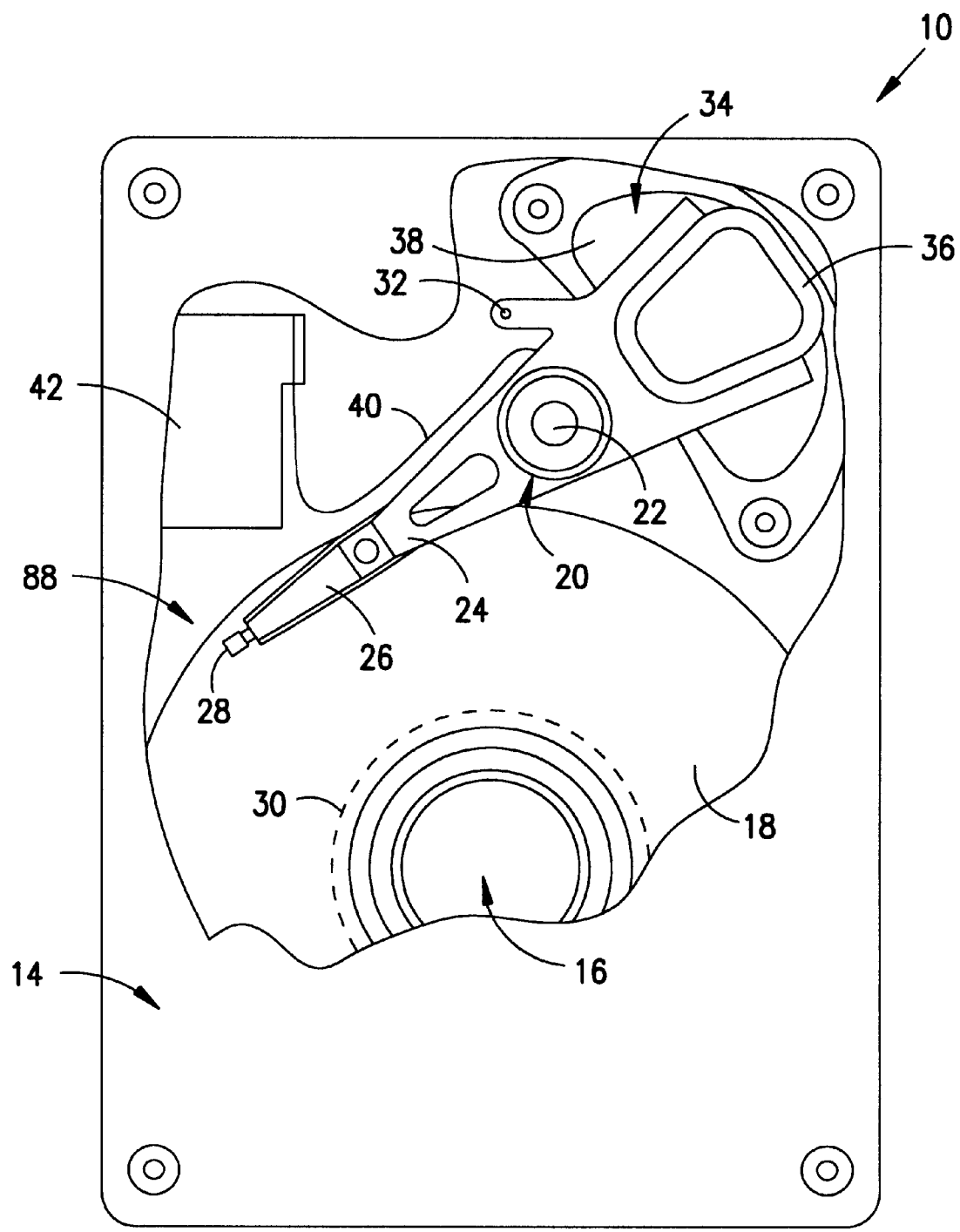
FIG. 1 is a top plan view of a disc drive in which the present invention is particularly useful.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is a top plan view of a disc drive 10 in which the present invention is particularly useful. The disc drive 10 includes a base deck 12 to which various disc drive components are mounted and a top cover 14, which is shown in a partial cut-away fashion to expose selected components of interest. It will be readily understood that the base deck 12 includes an interior surface to which various disc drive components are mounted, as well as side walls which, in combination with the top cover 14, provide sufficient height to house these components within a sealed internal environment.

Mounted to the base deck 12 is a spindle motor (not shown) having a rotatable spindle hub 16 to which a plurality of discs 18 are mounted for rotation at a constant high speed. Adjacent the discs 18 is an actuator assembly 20 (also referred to as an "E-block") which pivots about a pivot shaft 22 in a rotary fashion. The actuator assembly 20 includes actuator arms 24 which support gimbal assemblies 26 (also referred to as "load springs"). The load springs 26 in turn support heads 28, with each of the heads 28 corresponding to a surface of one of the discs 18. As provided hereinabove, the heads 28 are positionably located over data tracks (not shown) of the discs 18 in order to read data from and write data to the tracks, respectively. At such time that the disc drive 10 is not in use, the heads 28 are moved to landing zones (denoted at broken line 30), which are located in FIG. 1 near the inner diameter of the discs 18.

It will be recognized that the E-block 20 is provided with a latching arrangement (shown generally at 32) to secure the E-block 20 when the disc drive is not in use. For a general discussion of typical E-block latching arrangements, see U.S. Pat. No. 5,231,556 entitled SELF-HOLDING LATCH ASSEMBLY, issued Jul. 27, 1993 to Blanks, assigned to the assignee of the present invention and incorporated herein by reference.

Continuing with FIG. 1, the E-block 20 is controllably positioned by way of a voice coil motor (VCM, shown generally at 34), comprising an actuator coil 36 immersed in the magnetic field generated by a permanent magnet 38. It will be recognized that a magnetically permeable flux path (such as a steel plate) is mounted above the actuator coil 36 to complete the magnetic circuit of the VCM 34, but for purposes of illustration this flux path has not been shown in FIG. 1. When controlled direct current is passed through the actuator coil 36, an electromagnetic field is set up which interacts with the magnetic circuit of the VCM 34 to cause the actuator coil 36 to move relative to the permanent magnet 38. As the actuator coil 36 moves, the E-block 20 pivots about the pivot shaft 22, causing the heads 28 to move across the surfaces of the discs 18.

To provide the requisite electrical conduction paths between the heads 28 and disc drive read/write circuitry (not shown in FIG. 1), head wires (not separately shown) are routed on the E-block 20 from the heads 28, along the gimbal assemblies 26 and the actuator arms 24, to a flex circuit assembly 40. The head wires are secured by way of a suitable soldering process to corresponding pads (not separately designated in FIG. 1) of the flex circuit assembly 40. In turn, the flex circuit assembly 40 is connected to a flex circuit bracket (shown generally at 42) in a conventional manner and communication is provided between the flex circuit bracket 42 and a printed circuit board (PCB) mounted to the underside of the disc drive 10. As will be recognized, the PCB houses the interface and control electronics for the disc drive 10.

Figure 2:
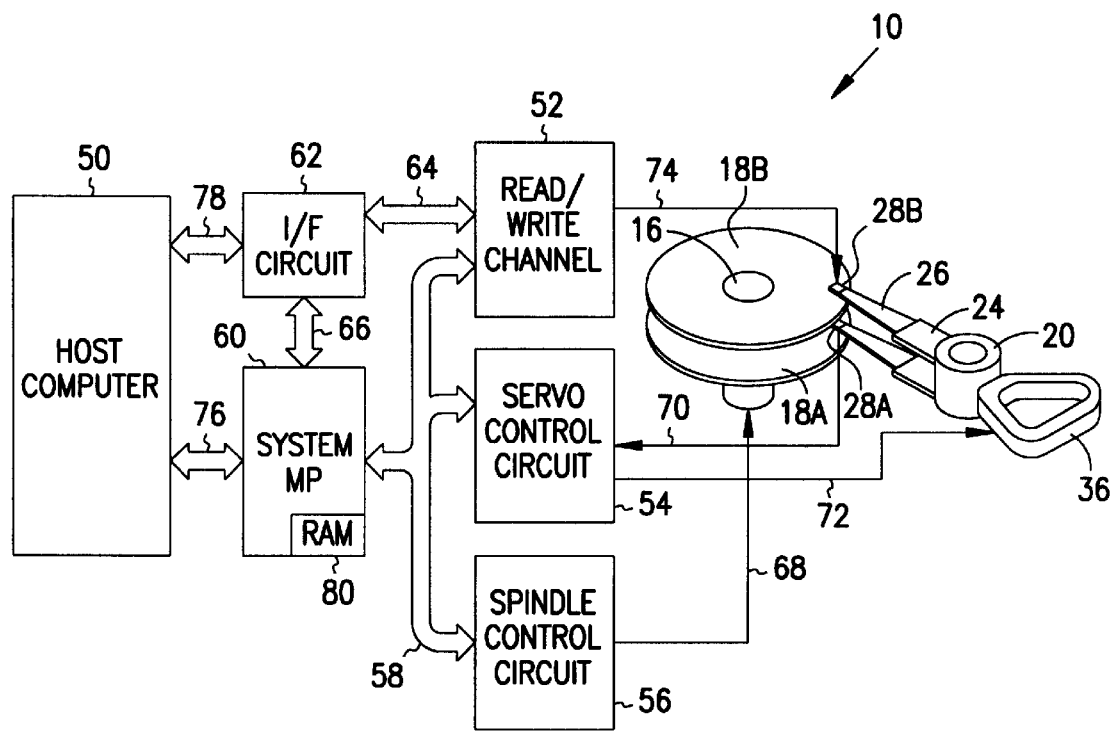
FIG. 2 is a functional block diagram of the disc drive of FIG. 1.

Referring now to FIG. 2, shown therein is a simplified functional block diagram of the disc drive 10 of FIG. 1, operably connected to a host computer 50. More particularly, FIG. 2 shows the disc drive 10 to generally comprise a read/write channel 52, a servo control circuit 54 and a spindle control circuit 56, all operably connected by way of control bus 58 to a system microprocessor 60. It will be recognized that the control bus 58 comprises the necessary connections for the system microprocessor 60 to communicate with and control these disc drive circuits. Additionally, an interface circuit 62 is shown connected to the read/write channel 52 (by way of an internal data bus 64) and to the system microprocessor 60 (by way of a control bus 66), with the interface circuit 62 serving as a data interface for the disc drive 10.

As will be recognized, the spindle control circuit 56 controls the rotational speed of the spindle hub 16 and discs 181, 182, as generally indicated by signal path 68. As the construction and operation of the spindle control circuit 56 are conventional, these will not be further discussed herein.

The servo control circuit 54 of FIG. 2 is shown to receive servo position information from a head 281 by way of signal path 70 and, in response thereto, provides a correction signal by way of signal path 72 to the actuator coil 36 in order to position the heads 281, 282 with respect to the discs 181, 182. The actuator coil 36 interacts with the permanent magnet 38 of the VCM 34 as described hereinabove. As will be recognized, in a dedicated servo system the head 281 would comprise a servo head, dedicated to providing generally continuous servo positioning information to the servo control circuit 54 with the corresponding surface of the disc 181 serving as a dedicated servo surface. In such a dedicated servo system, the remaining heads (282 being the only other head shown in FIG. 2) would comprise data heads and would be used to transfer data to and from the remaining discs during write and read operations, respectively.

Alternatively, it will be recognized that in an embedded servo system, each of the heads 281, 282 would serve as both servo and data heads, with both servo information and data being stored on the tracks of the discs 181, 182. In an embedded servo system, functional connections would generally be provided from each of the heads 281, 282 to the servo control circuit 54 as well as to the read/write channel 52. However, it will be recognized that the present invention does not depend on the use of a particular type of servo system. For more discussion regarding the construction and operation of a typical dedicated servo control circuit, see U.S. Pat. No. 5,262,907 entitled HARD DISC DRIVE WITH IMPROVED SERVO SYSTEM, issued Nov. 16, 1993 to Duffy, McKenzie, Heydari and Woods, assigned to the assignee of the present invention.

Finally, the read/write channel 52 passes data to be written to and read from the disc 182, respectively, by way of signal path 74 and the head 282. That is, in response to a write command received by the system microprocessor 60 from the host computer 50 (by way of a command bus 76), the system microprocessor 60 controls the flow of data to be written to disc from the host computer 50 to the interface circuit 62 (by way of an external data bus 78) and from the interface circuit 62 to the read/write channel 52 (by way of the internal data bus 64). The read/write channel 52, in turn, provides a write current to the head 282 by way of the path signal 74 in order to write the data by selectively magnetizing selected data tracks on the disc 182.

Likewise, in response to a read command from the host computer 50, the head 282 detects flux transitions from the selected data tracks on the disc 182 and provides an analog read signal to the read/write channel 52, which in turn converts the analog read signal to digital form and performs the necessary decoding operations to provide data to the interface circuit 62 for output to the host computer 50. In controlling these various operations of the disc drive 10, the system microprocessor 60 includes the use of programming stored in system microprocessor random access memory (RAM) 80.

Figure 3:
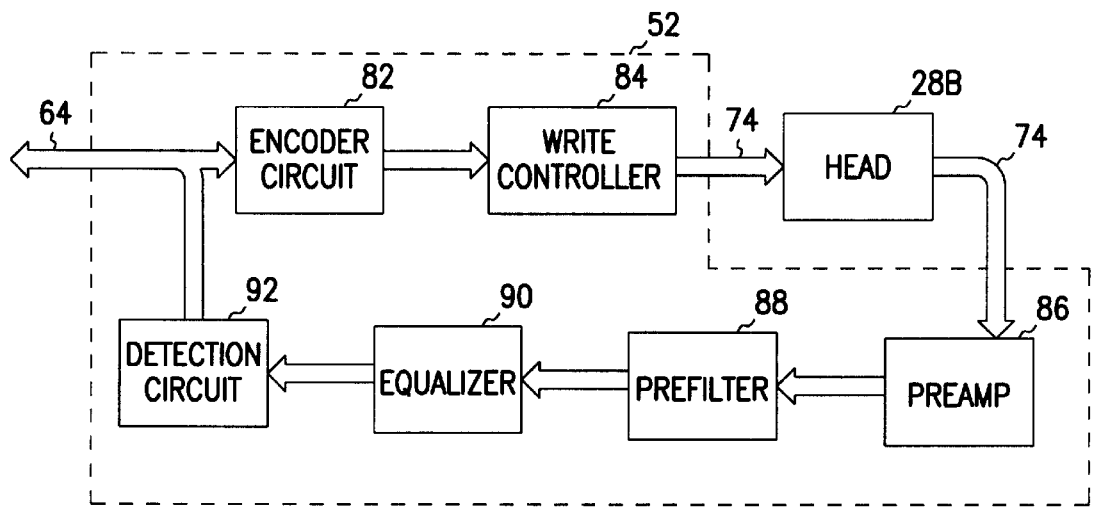
FIG. 3 is a functional block diagram of the read/write channel of the disc drive of FIG. 2.

FIG. 3 shows a functional block diagram of the read/write channel 52 of FIG. 2, operably connected to the head 282. The read/write channel 52 will now be described in further detail. For purposes of disclosure, the read/write channel 52 is contemplated as employing partial response maximum likelihood (PRML) signal processing techniques, although as will be recognized the present invention is not so limited to the particular type of read/write channel shown.

The read/write channel 52 includes an encoder circuit 82 which, upon receipt of data from the interface circuit 62 by way of the internal data bus 64, encodes the data with run length-limited and ECC encoding. The encoded data is provided to a write controller 84, which serializes the encoded data and provides a time-varying write current to the head 282 to write the encoded data when the head 282 is over the desired sector on the disc 182.

At such time that the data is to be subsequently read from the disc 182 and provided to the host computer 50 (of FIG. 2), the head 282 is moved to the selected data track. Once the sector containing the data passes under the head 282, the head 282 outputs a read signal indicative of the encoded data that was previously written to the sector. Particularly, the head 282 detects flux transitions from the selective magnetization of the sector and provides the read signal to a preamp 86, which amplifies the signal (as will be recognized, the preamp 86 can be incorporated as part of the flex circuit assembly 40 of FIG. 1). A prefilter 88 preforms preliminary frequency domain filtering of the preamplified read signal to reduce the effects of noise and the filtered read signal is then provided to an equalizer circuit 90. As disclosed in U.S. Pat. No. 5,592,340 entitled COMMUNICATION CHANNEL WITH ADAPTIVE ANALOG TRANSVERSAL EQUALIZER issued Jan. 7, 1997 by Minuhin et al., assigned to the assignee of the present invention, the equalizer circuit 90 performs time-domain equalization of the read signal to filter the signal to an approximation of a waveform used with a selected class of partial response signaling (such as class PR-IV). As will be recognized, such equalization allows intersymbol interference (ISI) from adjacent bits in the read signal to be controlled, allowing recovery of the initial data sequence written to disc to be detected from the equalized signals output from the equalizer circuit 90.

The equalizer circuit 90 operates in response to tap weights (not shown) supplied to the equalizer circuit 90 from, for example, the system microprocessor 60. Although an analog transversal equalizer circuit 90 has been represented in FIG. 3, digital synchronous equalizers are also well known in the art; see for example, U.S. Pat. No. 5,422,760 entitled DISK DRIVE METHOD USING ZONED DATA RECORDING AND PRML SAMPLING DATA DETECTION WITH DIGITAL ADAPTIVE EQUALIZATION, issued Jun. 6, 1995 to Abbott et al.

Continuing with FIG. 3, the equalized output signal is provided to a detection circuit 92, wherein the equalized output signal is sampled and the samples are used to reconstruct the encoded data that was written to the sector. The detection circuit 92 includes the use of a maximum likelihood detector and a timing circuit, examples of which are disclosed in U.S. Pat. No. 5,430,768 entitled IMPROVED MAXIMUM LIKELIHOOD DETECTOR FOR A DISC DRIVE PRML READ CHANNEL, issued Jul. 4, 1995 to Minuhin et al. and U.S. Pat. No. 5,459,757 entitled TIMING AND GAIN CONTROL CIRCUIT FOR A PRML READ CHANNEL, issued Oct. 17, 1995 to Minuhin et al. Both of these references are assigned to the assignee of the present invention.

Once the encoded data is reconstructed, conventional ECC circuitry (not separately shown) operates to detect and correct read errors in the data and to provide an indication to the system microprocessor 60 (of FIG. 2) where uncorrected read errors are present in the retrieved data. At such time that no read errors are detected, or those errors that are detected are corrected by the ECC circuitry, the retrieved user data is output by the detection circuit 92 to the interface circuit 62 (of FIG. 2) for subsequent transfer to the host computer 50.

Figure 4:
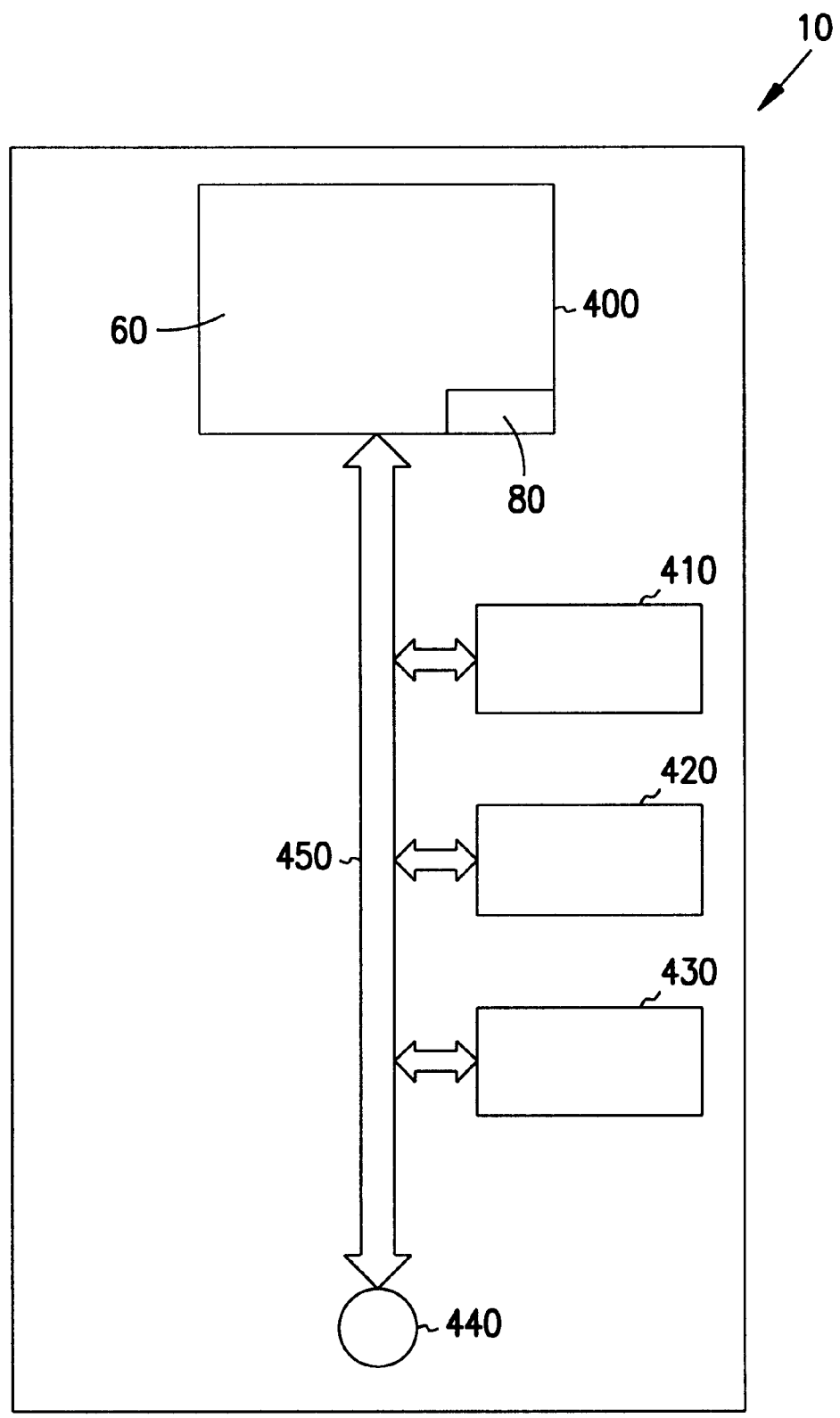
FIG. 4 is a functional block diagram of the READ ERROR RECOVERY system which includes various sensors input to the system microprocessor and various read error recovery tables stored in memory associated with the microprocessor.

Having concluded a discussion of the general construction and operation of the read/write channel 52 of FIG. 3, attention is now directed to FIG. 4 which provides a generalized flow chart of steps performed by the disc drive 10 in accordance with the present invention. More particularly, FIG. 4 identifies a READ ERROR RECOVERY routine, which represents a routine stored in the form of programming in the RAM 80 and used by the system microprocessor 60 when uncorrected read errors are detected by the read/write channel 52.

As an overview, the READ ERROR RECOVERY routine generally operates in response to an uncorrected read error by first providing a series of "free retries", wherein the data containing the uncorrected read error is reread a number of times. Should the free retries result in the correction of the read error, the disc drive 10 continues normal operation and the routine ends.

However, when the free retries do not result in the correction of the read error, the routine advances to a READ ERROR RECOVERY TABLE, containing a sequentially ordered set of corrective operations. Each of the corrective operations are performed in order, until either the read error is resolved or the table is exhausted. Should the table be exhausted without correction of the error, the disc drive 10 sets a hard error flag, notifies the host computer 50 of the error condition and takes other suitable action, such as marking the sector containing the uncorrectable error as a "bad sector". On the other hand, when a corrective operation from one of the tables corrects the error, the table and the specific corrective action remedying the read error is noted in a table. The read error condition and the table necessary to produce the corrective action are noted for correlation in future read error situations. In this manner, the table is continually adapted to the performance of the drive, optimizing the operation of the drive and minimizing the time required to correct read errors.

FIG. 4 is a functional block diagram of the READ ERROR RECOVERY system 400 which includes various sensors input to the system microprocessor and various read error recovery tables stored in memory associated with the microprocessor 80. The READ ERROR RECOVERY system 400 includes the microprocessor 60 and the random access memory 80. The READ ERROR RECOVERY system 400 also includes a plurality of sensors 410, 420, 430 and 440. The plurality of sensors 410, 420, 430 and 440 are electrically coupled to the microprocessor 60 via a data and command bus 450. The sensors 410, 420, 430 and 440 monitor the disc drive 10 for various disturbances. Various disturbances are typically responsible for some difficulties in recovering blocks of data. Temperature and vibration are two examples of disturbances which may result in difficulty in recovering blocks of data. Sensors 410, 420, 430 and 440 are located on the disc drive and can be used to measure the magnitude of various disturbances that occur.

It should be noted that the sensors do not necessarily have to be physical sensors. For example, a sensor can be a collection of data that describes a disturbance such as a log that exists on the drive. For example, sensor 410 can be a log of the fly height, the head resistance or the rotational vibration. Another sensor, such as 420, is a real time query of a component on the drive. For example, the read channel or various components of the read channel can be queried for data quality. The read channel can also be monitored for thermal asperity events. Thermal asperities typically result in a DC offset in the read data and there are various circuits within a read channel 52 that are used to recognize and correct for thermal asperities. Other components can be queried for ambient temperature or the disc drive component temperature during an operating condition. Still other sensors such as 440 can be physical sensors. For example, measuring temperature would require a sensor 440 to be a thermometer positioned within the disc drive enclosure. Still other physical sensors such as 430 can be one of many sensors that are used. For example, 430 could be a set of accelerometers that are positioned around the disc drive 10, the output of which indicates a vibration event. The outputs of the various sensors 410, 420, 430 and 440 are placed onto the bus 450 and input to the microprocessor 60. The microprocessor 60 performs a READ ERROR RECOVERY routine 500 which is detailed in FIG. 5 and discussed below.

Figure 5:
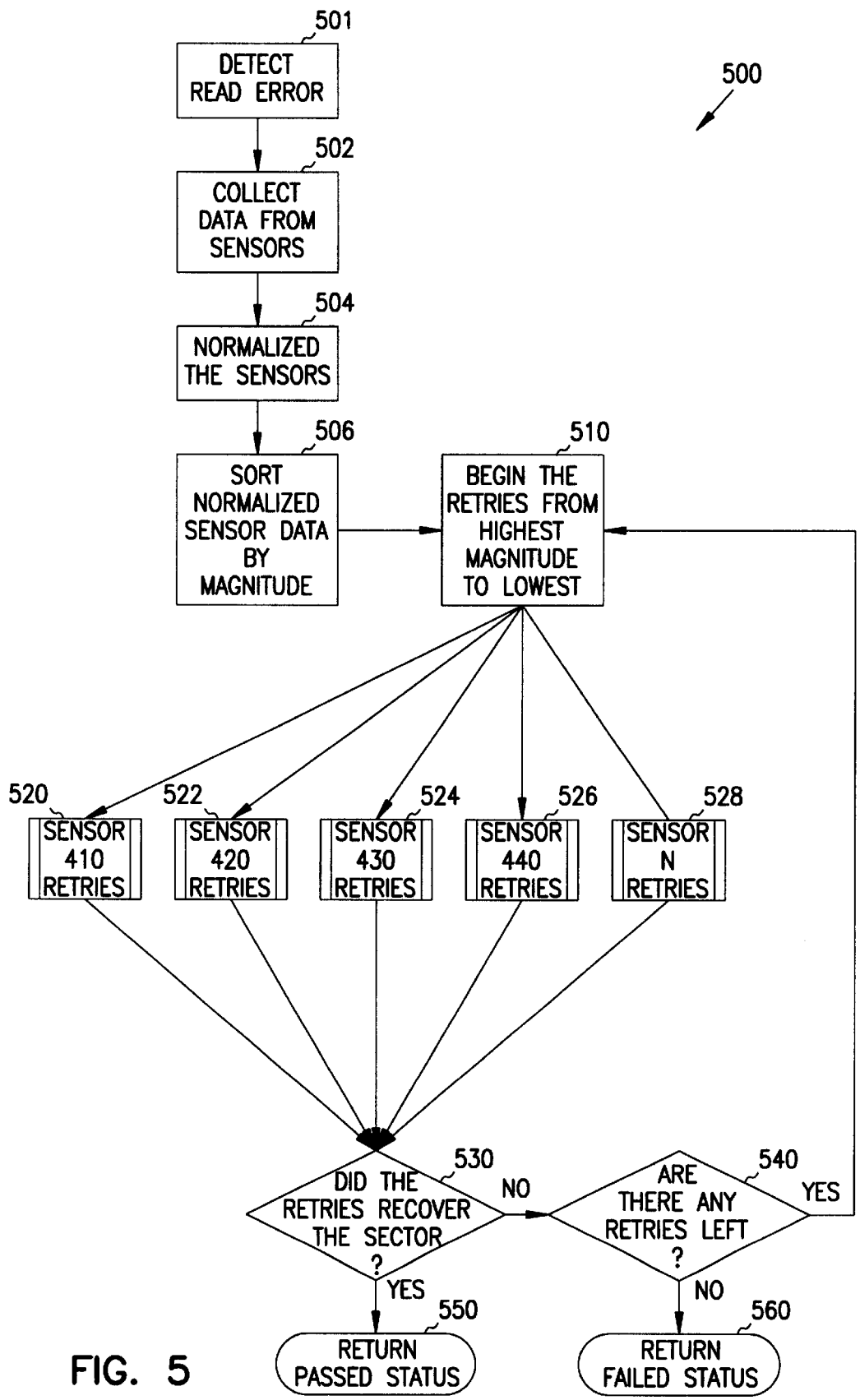
FIG. 5 is a generalized flow chart for a READ ERROR RECOVERY routine performed by the system microprocessor of FIG. 2 in response to a read error reported by the read/write channel of FIG. 3.

FIG. 5 is a generalized flow chart for a READ ERROR RECOVERY routine 500 performed by the system microprocessor 60 of FIG. 2 in response to a read error reported by the read/write channel of FIG. 3. Initially a read error is detected, as depicted by step 501. The READ ERROR RECOVERY routine 500 begins at step 502, wherein the system microprocessor 60 collects data from the sensors 410, 420, 430 and 440 within the disc drive 10.

The sensors 410, 420, 430 and 440 output the data onto the bus 450 where it is sent to the system microprocessor 60 for collection. The sensors 410, 420, 430 and 440 allow measurement of the disturbances that may explain the inability of the disc drive to recover data through normal methods. It should be noted that the sensors shown in FIG. 4 are merely illustrative. There can be more or less sensors used in a particular application of this invention without departing from the spirit of the invention. The data collected from the sensors is then normalized, as depicted by step 504. The sensors 410, 420, 430 and 440 measure the magnitude of various disturbances.

The measurements are normalized so that the magnitude of the various disturbances can be validly compared with respect to previous disturbances detected by the sensors. Once normalized, the sensor data is sorted based upon the magnitude of the disturbance sensed by the various sensors 410, 420, 430 and 440. This is shown as step 506. Associated with each sensor 410, 420, 430 and 440 is a group of retries that are designed to correct the disturbance detected by a particular sensor 410, 420, 430 and 440. Essentially, a group of retries is selected that is successful in recovering data for a particular disturbance. For example, a disturbance caused by temperature may be easily corrected by doing several retries of reads where the transducing head is shifted off center by a selected amount. Retries associated with vibration may merely be to do a re-read with no particular changes in the absence of a vibration.

The corrective actions can be stored in the random access memory 80 of the microprocessor as lists that are associated with the various disturbances. In the alternative, the microprocessor 60 may store all the particular types of corrective steps in the random access memory and may assemble a list of retries or corrective action for a particular disturbance. One other note is that a combination of sensors may be useful in determining what the disturbance is or was. For example, when a vibration is sensed as well as a thermal asperity, it may indicate that a shock event was encountered which resulted in the head striking the disc rather than just merely a thermal asperity on the disc.

After sorting the disturbances, retries are started from the highest magnitude disturbance to the lowest magnitude disturbance. Again, associated with each sensor 410, 420, 430 and 440, and associated with each group of sensors, are a group of retries that are designed to correct a disturbance detected by the sensor or group of sensors. The retries are begun from highest to lowest as depicted by step 510. The first set of sensor retries 520 is retried first if the disturbance is related to sensor 1. Another sensor, for example, sensor 3 retries, will be retried first if sensor 3 is the highest magnitude disturbance. The various sensor retries are shown as a set of various parallel paths to the sensor retry or corrective actions associated with a particular sensor. The sensor retries associated with sensor 410 are depicted by step 520, the sensor retries or corrective actions associated with sensor 420 are shown by box 522, the sensor retries for sensor 430 are depicted by box 524 and the sensor retries for sensor 440 are depicted by box 526. A final box 528 is depicted for sensor N retries since there can be a number of sensors or a combination of sensors may give rise to a different list of corrective actions used to recover the data.

The order of the sensor retries is selected such that the highest magnitude disturbance results in having the first set of retries or corrective actions taken. The corrective action or sensor retries associated with the highest or largest disturbance is first retried and then the sensor retries are basically ordered based upon the magnitude of the disturbance associated with the various sensors or combination of sensors. Once one retry is tried, a determination is made of whether the retry has recovered the sectors as depicted by decision box 530 in FIG. 5. If the data has not been recovered from a sector, another decision box 540 determines whether there are any other retries or corrective actions left. If there are, the next order of magnitude down from the last retry, is tried. If there are not, the microprocessor 60 returns a failed status as depicted by N box 560, to the host system. Whenever the retries do recover the data in the sector, the microprocessor 60 returns a passed status to the host processor, as depicted by N box 550. In essence, all of the retries or corrective actions associated with the various disturbances are stepped through in order of magnitude until the data is recovered or until the data is not recovered.

FIG. 6 is a generalized representation of one of the read error recovery tables associated with one sensor utilized in the data recovery procedure shown in FIG. 5. It should be noted that there are a number of corrective actions 520, 522, 524, and 526 that are implemented dependent on which of the sensors sensed a disc drive disturbance. Shown here in FIG. 6 is one of the tables that comprises a corrective action. It is contemplated that these tables may be reordered or that different corrective actions may be used in one table. As a result, the one read error recovery table shown in FIG. 6 is merely an example. Other data recovery schemes, such as shown and described in FIG. 8, may be used in other tables of corrective actions.

As shown in FIG. 6, the table comprises an ordered sequence of 17 corrective operations, each with a corresponding table count, so that each of the corrective operations are performed in order until either the table is exhausted or the error is corrected. It will be recognized that a variety of corrective operations can be used as desired depending upon the design and performance of a particular disc drive.

Referring now specifically to FIG. 6, the first corrective operation is shown to be a "SEEK AWAY", which comprises performing a one-track seek of the head 282 away from the selected track containing the data to an adjacent destination track, returning the head 282 to the selected track, and then performing a reread of the data when the sector containing the data passes under the head 282. As will be recognized, such seek away operations have been found to be effective in the elimination of read errors caused by misalignment of the head 282 over the selected track as a result of, for example, a servo offset. Of course, the seek could be to a destination track other than a track adjacent to the selected track.

Continuing with the table of FIG. 6, the second and third corrective operations identified therein are "REREAD DATA" operations, which as will be recognized comprise rereading the data without other changes to the system; that is, the reread data operations are similar to the free retries discussed above.

The fourth corrective operation is identified as an "ADAPT READ CHANNEL" operation, which as will be recognized requires adaptation of the read channel parameters used by the read/write channel 52. Particularly, the preferred embodiment contemplates adaptation of the tap weights used by the equalizer circuit 90 as a result of the ADAPT READ CHANNEL operation, although other parameters used by the read channel could readily be adapted, as desired. The manner in which read channel adaptation can be accomplished is well understood by those skilled in the art and is discussed by the preceding Minuhin and Abbott references. Thus, additional discussion concerning adaptation of the read channel will not specifically be provided herein.

The fifth, sixth, seventh and eighth corrective operations are identified as "CHANGE ECC LEVEL" operations, which comprise using a different level of ECC decoding to correct reported errors in the retrieved data. As discussed in the previously incorporated Shaver and Deng references, ECC encoding is performed by appending a number of code bits to the end of each selected portion of data bits (such as each byte) to generate encoded words that mathematically map into a Galois field. That is, the code bits are added to the data bits so that the total bits in an encoded word can be considered to be the coefficients of a polynomial having defined roots, so that only mathematically defined combinations (encoded words) can exist. When an encoded word is retrieved, the word is compared to the set of defined combinations, so that encoded words containing read errors will generally not map into the set of defined combinations; thus, based upon the algorithm used by the ECC circuitry, illegal combinations can be detected and up to a selected number of the bits in such words can be changed in order to correct the presence of read errors therein. Once corrected, the code bits are thereafter stripped, allowing the originally recorded data bits to be output to the host computer 50.

As will be recognized, different algorithms, or levels of ECC correction, can be used with the same encoding scheme to detect and correct different numbers of errors in the retrieved encoded words, or to provide different probabilities of detection and correction. Risks associated with ECC correction generally include both the unnecessary correction of correct data and the non-detection of read errors in the retrieved data. Thus, an optimal level of ECC correction is typically chosen which balances the number of correctable errors, the probability of miscorrection of errors and the probability of misdetection of errors. This optimal level is generally then used by the ECC circuitry during normal operation of the read/write channel 52; however, it will be recognized that a different level of ECC correction can be advantageous in some cases. Thus, based upon the foregoing, the "CHANGE ECC LEVEL" corrective operation entails rereading the data using a different level of ECC correction in order to correct the erroneous data.

The table shown in FIG. 6 also includes several rereads with the transducer head being located 6 percent off either side of the track center on either side of the track center. There are also several rereads with the transducer head being located 12 percent off either side of the track center on either side of the track center. The final corrective step is a wiggle retry.

FIG. 7 is a table of data 700 stored in memory 80 of the disc drive 10. As mentioned previously, the sensors 410, 420, 430 and 440 may include a table such as the table of data 700 shown in FIG. 7. The table 700 can be used to store any type of data. In this particular example, the head number and fly height for the particular head as well as the time is stored so that a historical perspective of the fly height is gained. In the first column 710, the head number is stored. In the second column, the fly height measurement is stored. The second column has a reference number 720. In the third column 730, the date and time is stored. It should be noted that a physical table is not necessarily stored in the graphical form as shown, but the data is stored in a table lookup within the memory of the disc drive 10. The memory of the disc drive that is used for this type of data may be some sort of static memory. The static memory could even be on a reserve area of the disc 18. Of course, the sensors could also include other tables' data for storing other data used as one of the sensors 410, 420, 430 and 440 for the disc drive.

Table 1 is a generalized representation of another read error recovery table associated with one sensor utilized in the data recovery procedure shown in FIG. 5. On the left side of the table the number of the operation is shown. For example, 24 different retry operations are shown in the table. Across the top of the table are the various retry operations that can take place. The retry operations include seeking away, changing the Rgain, varying the MR bias (MRDac in the table), varying the length of the preamble, varying the sync threshold, using a forced sync threshold, changing the read bandwidth, changing the read boost, varying the phase lock loop dampening or the read gate delay, or shifting the timing window.

TABLE 1

| | On Track Percent of Track | Seek Away | Rgain Reg. 22h | MRDac Reg. 04h | Preamble Length Bytes for 8 + 2* value | Sync Threshold Reg 4Ah threshold | Sync Threshold Flag | Decreased Preamble Reg 7Ah Bits 2 . . .0 | Read Bandwidth Reg 52h | Read Boost Reg 72h |
|---|---|---|---|---|---|---|---|---|---|---|
| 1 | | 8 | | | | | | | | |
| 2 | | 8 | | | | | | | | -8 |
| 3 | | -8 | | | | | | | | |
| 4 | | -8 | | | | | | | | -8 |
| 5 | | | | | | | 1 | 0 | 0 | |
| 6 | | | | | | | 1 | 0 | 0 | -8 |
| 7 | | | | | | 4 | 1 | 0 | 0 | -16 |
| 8 | | | | | | 4 | 1 | 1 | | -24 |
| 9 | | | 8 | | | | | | | |
| 10 | | | 8 | | | | | | | -8 |
| 11 | | | 8 | | | | | | | -16 |
| 12 | | | 8 | | | | | | | -24 |
| 13 | | | -8 | | | | | | | |
| 14 | | | -8 | | | | | | | -8 |
| 15 | | | -8 | | | | | | | -16 |
| 16 | | | -8 | | | | | | | -24 |
| 17 | | | 16 | | | | | | | |
| 18 | | | 16 | | | | | | | -8 |
| 19 | | | 16 | | | | | | | -16 |
| 20 | | | 16 | | | | | | | -24 |
| 21 | | | -16 | | | | | | | |
| 22 | | | -16 | | | | | | | -8 |
| 23 | | | -16 | | | | | | | -16 |
| 24 | | | -16 | | | | | | | -24 |
| 25 | | | | | | | | 1 | | |
| 26 | | | | | | | | 1 | | |
| 27 | | | | | | | | 1 | | |
| 28 | | | | | | | | 1 | | |
| 29 | | | | | | | | 1 | | |
| 30 | | | | | | | | 1 | | |
| 31 | | | | | | | | 1 | | |

| | Read PLL Damping Reg 1Bh | Read Gate Delay Value in Bytes | Preamp TA Adjust | Preamp TA Fast Enable | Timing Window Shift Reg 5Bh | Retry Group | TA1 Reg 6C | TA2 Reg 7C | TA3 Reg 05h | TA4 Reg 15h | TA |
|---|---|---|---|---|---|---|---|---|---|---|---|
| 1 | | | | | | 1 | | | | | |
| 2 | | | | | | 1 | | | | | |
| 3 | | | | | | 1 | | | | | |
| 4 | | | | | | 1 | | | | | |
| 5 | 0 | 0 | 0 | 0 | 0 | 1 | | | | | |
| 6 | | | | | | 1 | | | | | |
| 7 | | | | | | 1 | | | | | |
| 8 | | | | | | 1 | | | | | |
| 9 | | | | | | 2 | | | | | |
| 10 | | | | | | 2 | | | | | |
| 11 | | | | | | 2 | | | | | |
| 12 | | | | | | 2 | | | | | |
| 13 | | | | | | 2 | | | | | |
| 14 | | | | | | 2 | | | | | |
| 15 | | | | | | 2 | | | | | |

TABLE 1-continued

| | | | | | |
|----|---|---|---|---|---|
| 16 | | | | | 2 |
| 17 | | | | | 2 |
| 18 | | | | | 2 |
| 19 | | | | | 2 |
| 20 | | | | | 2 |
| 21 | | | | | 2 |
| 22 | | | | | 2 |
| 23 | | | | | 2 |
| 24 | | | | | 2 |
| 25 | 3 | 0 | 0 | 0 | 3 |
| 26 | 3 | 0 | 0 | 0 | 3 |
| 27 | 3 | 0 | 0 | 0 | 3 |
| 28 | 3 | 0 | 0 | 0 | 3 |
| 29 | 3 | 0 | 0 | 0 | 3 |
| 30 | 3 | 0 | 0 | 0 | 3 |
| 31 | 3 | 0 | 0 | 0 | 3 |

Advantageously, the present invention provides a method and apparatus for optimizing the read/write channel error recovery process in a disc drive. The data recovery procedure eliminates individual data recovery procedures that have a low probability of resulting in correction. In addition, the corrective procedure reduces the time required to recover from read errors. Another advantage includes an error recovery procedure which adapts to the various conditions causing the read and write errors.

Figure 8:
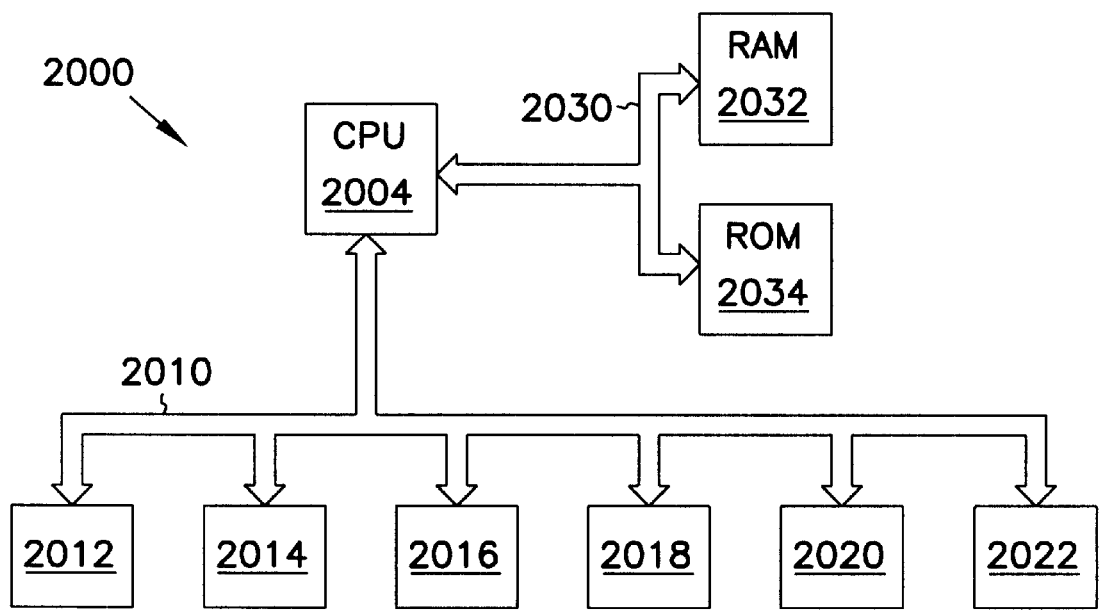
FIG. 8 is a schematic view of a computer system which includes the inventive disc drive.

FIG. 8 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a disc drive employs a method of recovering data from a magnetic storage device 10. The magnetic storage device 10 includes a plurality of components including a disc 18 for storing data. The disc 18 has at least one track 19 in which includes a plurality of sectors for storing data. The storage device also has a transducer 28 for reading and writing data to the surface of the disc 18. The method for recovering data includes the steps of sensing various disturbances 502 to the disc drive 10, and detecting a read error in the data of at least one sector of said plurality of sectors. The method also includes the step of implementing a read error recovery procedure 500 responsive to sensing a disturbance 502 to the disc drive 18. The read error recovery procedure 520 which is implemented is associated with the sensed disturbance.

The method may include sensing 502 a temperature of the disc drive 10, or sensing 502 a temperature of at least one of the components of the disc drive, or sensing 502 a vibration of the disc drive. The sensing step may also include the steps of collecting data from a sensor 502, and normalizing the data from the sensor 504 of the disc drive 10. The sensing step may also include the step of sorting the normalized data 506 from the sensor. The sensed data my be normalized on the a basis of magnitude. More than one sensor may be used. As a result, the method may include the steps of collecting data from a plurality of sensors 502 normalizing the data from the plurality of sensors 504 of the disc drive 10. The normalized data from the plurality of sensors may be sorted 506 on any basis including magnitude.

The step of the implementing corrective procedures or read error recovery procedures includes selecting a grouping of corrective actions 520 from a plurality of groups 520, 522, 524, and 526 of corrective actions. Each group of corrective actions 520, 522, 524, and 526 is associated with a particular sensor. Each group of corrective actions 520, 522, 524, and 526 is associated with a particular sensed disturbance.

A disc drive 10 includes at least one sensor for sensing disturbances to the disc drive. The disc drive 10 includes a system microprocessor 60 in electrical communication with the sensor. The system microprocessor 60 has a random access memory 80. A plurality of sets of corrective procedures are stored in the random access memory 60 of the microprocessor 80. The system microprocessor 60 executes the sets of corrective procedures 520, 522, 524, and 526 in an order in response to the sensed disturbances input to the system microprocessor 60. The sensor can be a log of data gathered over time, a query to at least one of the plurality of components of the disc drive. The sensor may also include a temperature sensor within the disc drive 10 or a vibration sensor within the disc drive 10. The sensor of the disc drive may also include a table of data stored within the random access memory of the disc drive 10. The disc drive may also be thought of as including a read/write channel within the disc drive, and a device for recovering data within the disc drive.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of recovering data from a data storage device, the data storage device being divided into storage segments, the method for recovering data comprising steps of:

(a) sensing at least two types of disturbances to the data storage device;

(b) collecting data from a plurality of sensors, each sensor being relative to a certain type of disturbance;

(c) normalizing the data from the plurality of sensors;

(d) sorting the normalized data from the sensors;

(e) detecting a read error in the data of at least one storage segment of the data storage device;

(f) selecting a read error recovery procedure that is responsive to the normalized data, the read error recovery procedure defining a group of corrective actions wherein each group of corrective actions is associated with compensating for a particular type of disturbance; and (g) implementing the selected read error recovery procedure.

2. The method of claim 1 wherein the sensing step (a) includes sensing at least one of the disturbances to be a temperature disturbance in the data storage device.

3. The method of claim 1 wherein the sensing step (a) includes sensing at least one of the disturbances to be a vibration disturbance of the data storage device.

4. The method of claim 1 wherein the sorting-step (d) further comprises sorting the normalized data by magnitude.

5. A data storage device comprising:

a data storage medium for storing data, the medium being divided into identifiable storage segments;

at least one sensor for sensing disturbances to the data storage device; and a system processor operatively coupled to the sensor and the data storage medium, the system processor implementing the steps of:

(a) sensing at least two types of disturbances to the data storage device;

(b) collecting data from the at least one sensor, each sensor being relative to a certain type of disturbance;

(c) normalizing the data from the at least one sensor;

(d) sorting the normalized data;

(e) detecting a read error in the data of at least one storage segment; and (f) selecting a read error recovery procedure that is responsive to the normalized data, the read error recovery procedure defining a group of corrective actions wherein each group of corrective actions is associated with compensating for a particular type of disturbance; and (g) implementing the selected read error recovery procedure.

6. The data storage device of claim 5 wherein there is at least one sensor that includes a log of data gathered over time.

7. The data storage device of claim 5 wherein there is at least one sensor that estimates a temperature within the data storage device.

8. The data storage device of claim 5 wherein there is at least one sensor that is a vibration sensor within the data storage device.

9. The data storage device of claim 5 wherein there is at least one sensor that comprises a table of data stored within a memory component of the data storage device.

* * * * *